UNITED STATES PATENT OFFICE.

ALBERT A. SOMERVILLE, OF FLUSHING, NEW YORK, ASSIGNOR TO NEW YORK BELTING & PACKING COMPANY, A CORPORATION OF NEW YORK.

PACKING MATERIAL.

1,349,737.  Specification of Letters Patent.  Patented Aug. 17, 1920.

No Drawing.  Application filed November 15, 1917.  Serial No. 202,183.

*To all whom it may concern:*

Be it known that I, ALBERT A. SOMERVILLE, a citizen of the United States, and a resident of Flushing, Long Island, county of Queens, and State of New York, have invented certain new and useful Improvements in Packing Material, of which the following is a full, clear, and exact description.

My invention relates to packing material especially adapted for use in and about apparatus and appliances for handling and delivering oils, particularly hydrocarbons.

Heretofore various forms of packing material have been used for oil pumps and pipe fittings and joints, valves, etc., used in pipe lines for handling oils, a common form being rubberized fibrous material. It has been found, however that such packings rapidly deteriorate and have a tendency toward deformation resulting in the loss of the tightness of the joint or seal, as a result of continued contact of the oil therewith.

Packing material made in accordance with my invention is adapted for use in relation where it is constantly subjected to the action of oils, either gasolene or other hydrocarbon oils, without likelihood of swelling, softening or becoming disintegrated.

To secure packing material having the desired properties, I employ a mass of loose, absorbent fibers, such as cotton sliver, in which is incorporated a viscous or semi-viscous material insoluble in oils of the character coming in contact with the packing. This material is used in sufficient volume to insure a thorough saturation or impregnation of the mass of fiber and the presence of a superficial coating upon the separate fibers sufficient to form a bond therebetween and make the mass impermeable to the oils. The base of this material may be shellac, glue or other similar material capable of being reduced to the desired viscous state and of being absorbed by the fibrous mass.

In practice, I have secured highly satisfactory results by means of packing material formed of cotton sliver saturated or impregnated with orange shellac dissolved in methyl alcohol, sufficient glycerin being added to prevent the hardening of the mixture and preserve flexibility therein and pliability in the packing material. The sliver, after being thoroughly saturated or impregnated with this mixture, may be twisted in strands of the desired thickness and configuration. This viscous or semi-viscous material not only forms a superficial coating upon the fibers, forming a bond between adjoining fibers, but serves as a filler between the fibers, thus not only protecting the fibers from the deleterious action of oil therein, but making the whole mass impermeable to such oils.

Other fibrous materials may be used in lieu of cotton, and oil resisting material, and unctuous materials to prevent hardening of the mixture, other than those specified may be employed.

Packing material made in accordance with my invention has been found to resist the action of oils—particularly gasolene, alone or mixed with kerosene, and to make all joints sufficiently tight to prevent leakage of the oils. Such a packing does not disintegrate with continued use, does not swell or soften, and does not lose its form.

Having described the invention what I claim as new and desire to have protected by Letters Patent is:—

1. Packing material comprising fibrous material saturated or impregnated with shellac dissolved in alcohol and containing an unctuous material.

2. Packing material comprising a mass of loose fibers, saturated or impregnated with orange shellac dissolved in methyl alcohol and containing glycerin.

3. A packing consisting of a mass of fibers coated and united by an oil resistant and flexible resinous composition including a non-drying agent.

Signed at New York, N. Y., this 12th day of November, 1917.

ALBERT A. SOMERVILLE.